(No Model.) 4 Sheets—Sheet 3.

H. S. CROMBIE.
MACHINE FOR MANUFACTURING LACING STUDS.

No. 549,108. Patented Nov. 5, 1895.

WITNESSES.
N. U. Walker.
L. C. Sargent.

INVENTOR.
Herbert S. Crombie

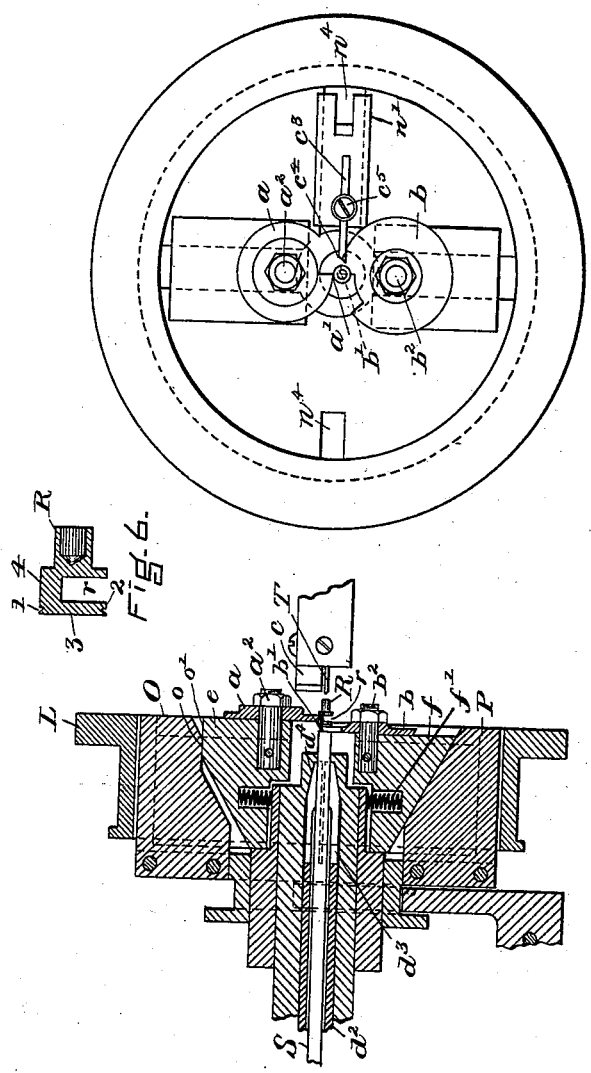

UNITED STATES PATENT OFFICE.

HERBERT S. CROMBIE, OF WALTHAM, ASSIGNOR OF ONE-HALF TO THEOPHILUS KING, OF BOSTON, MASSACHUSETTS.

MACHINE FOR MANUFACTURING LACING-STUDS.

SPECIFICATION forming part of Letters Patent No. 549,108, dated November 5, 1895.

Application filed March 1, 1895. Serial No. 540,202. (No model.)

*To all whom it may concern:*

Be it known that I, HERBERT S. CROMBIE, a citizen of the United States, residing at Waltham, in the county of Middlesex and State of Massachusetts, have invented a new and useful Machine for Manufacturing Lacing-Studs from a Metal Rod or Wire, of which the following is a specification.

My invention relates to a machine for manufacturing completed lacing-studs from a metal rod or wire, and so includes mechanism for the accomplishment of the various acts to be performed upon the rod or wire in order to produce such studs which have a hollow shank, a shoulder upon said shank, a neck having an axis different from the axis of the shank, and a head or hook which, if the stud is to be enameled, requires a channel thereon to hold the material.

My invention consists in devices for performing these various operations and in a combination of these, devices so that they may be operated as one machine for the accomplishment of the final result desired.

The objects of my new machine are to do away with elaborate mechanism; to provide new parts and new combinations of said parts; to secure a new mode of operation of these parts as a whole, and to provide a machine capable of making the completed lacing-stud, except the enameling thereof. I attain these objects by the mechanism illustrated in the accompanying drawings, in which—

Figure 1:
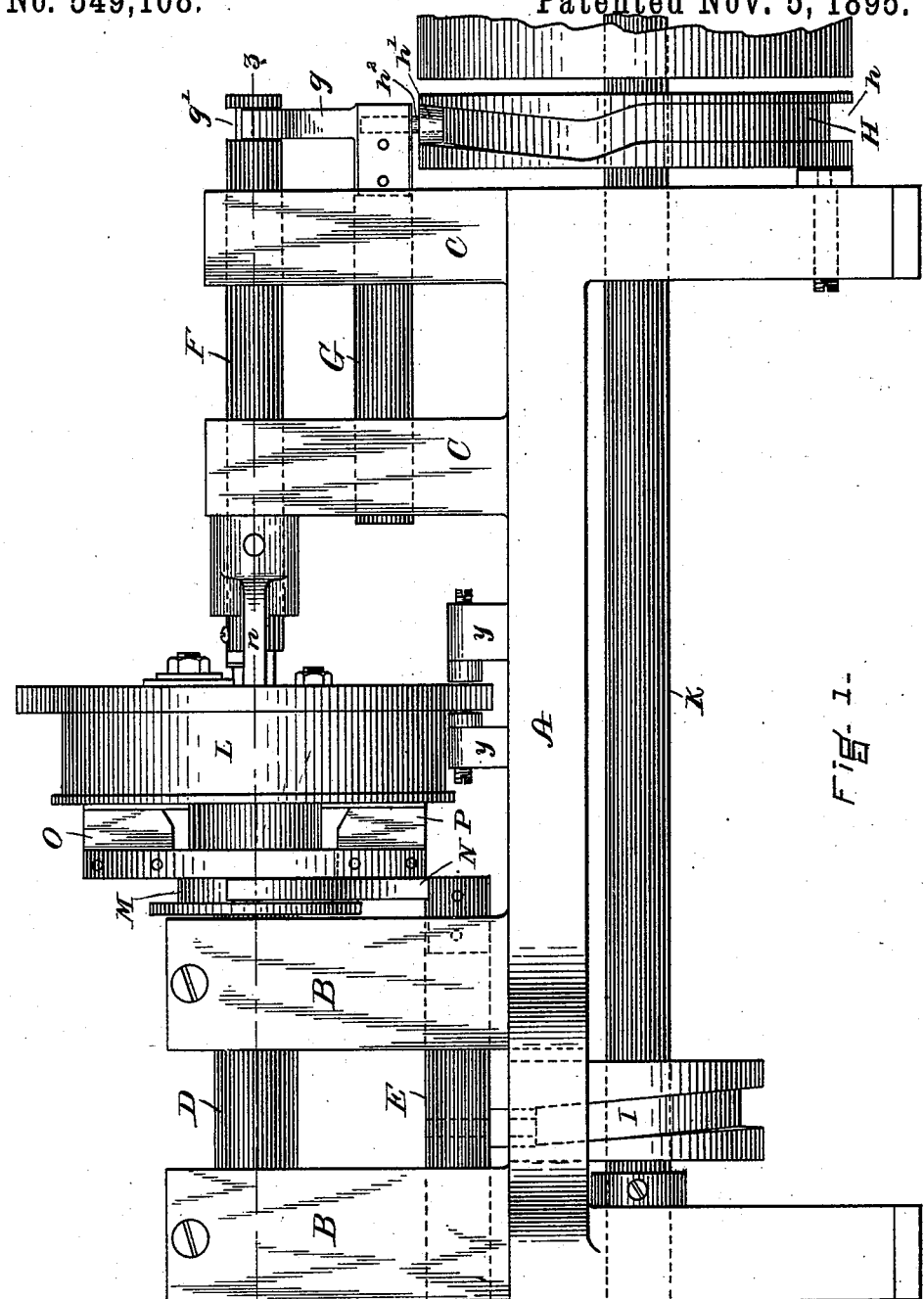
Figure 2:
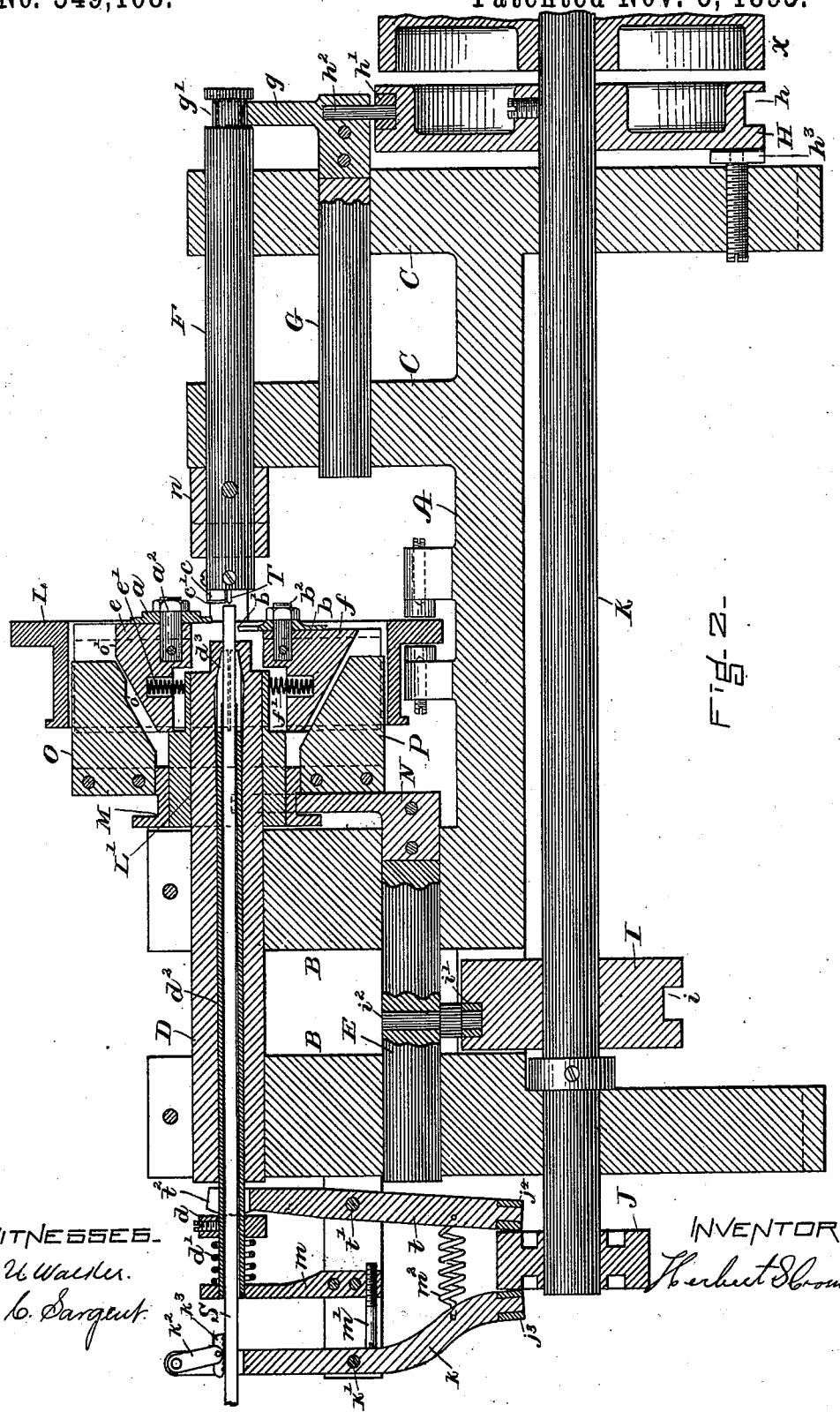
Figure 3:
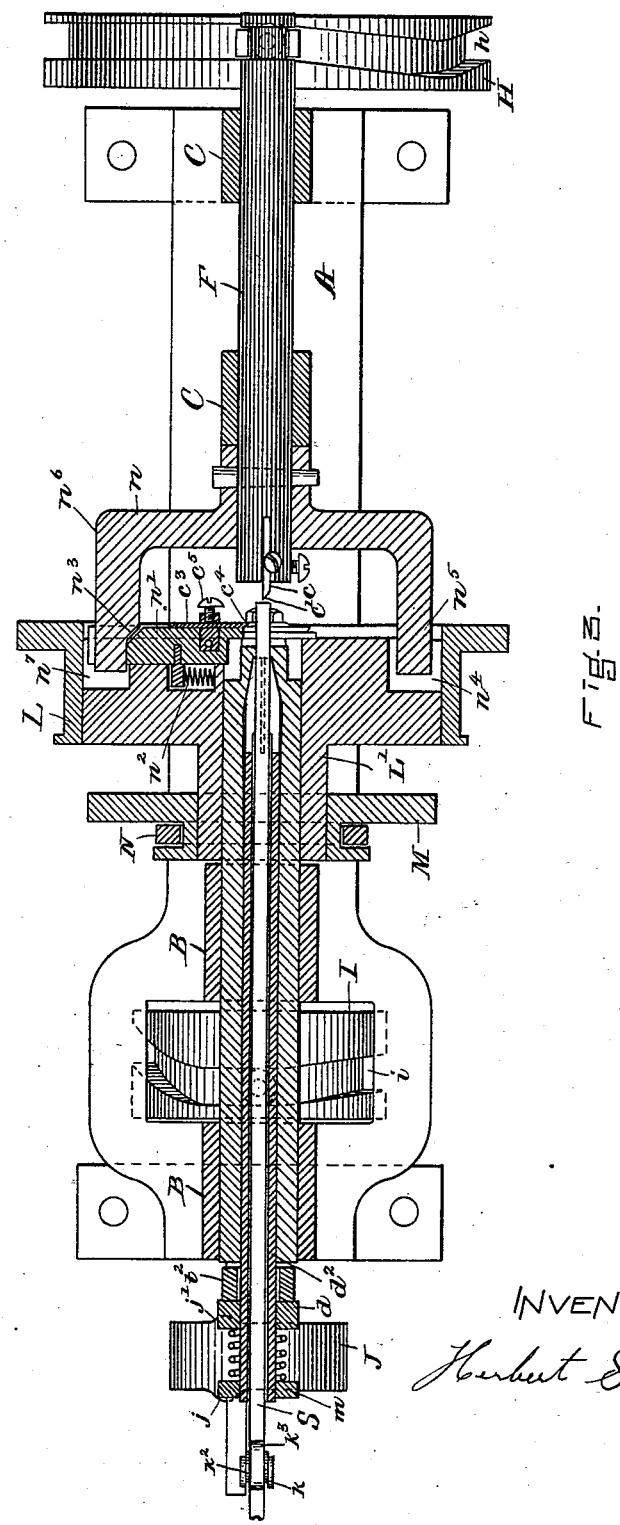

Figure 1 is a front elevation of my machine and its operating pulley and shaft. Fig. 2 is a longitudinal vertical section of Fig. 1. Fig. 3 is a horizontal section on line 3 3 of Fig. 1. Fig. 4 is a sectional detail of the pulley operating two of the cutting-knives when the same are in operative position. Fig. 5 is a face view of the pulley, showing the slot-cutter and the cutter for cutting off the completed lacing-stud and the channeling-cutter. Fig. 6 is a detail of the lacing-stud.

Similar letters and figures refer to similar parts throughout the several views.

Before pointing out the parts of my machine in detail I may say that my machine contains five principal combinations less than the entire machine or combination. I have, first, a fast and loose pulley or equivalent for operating a main shaft which operates three cam-wheels; second, one of these cams has a slight projection upon both of its sides by which I operate mechanism for feeding and firmly holding the wire rod; third, another cam operates a traveling shaft having an angle-piece for moving forward and back devices for bringing into operation three knives, one for cutting out the groove to form the neck and head of the stud, one to cut off the completed stud, and one to cut a channel upon the edge of its head; fourth, a pulley having slots for operating the three cutters aforesaid, and, fifth, the third cam moves a shaft back and forth which carries a drill for perforating the shank of the rivet and a knife for cutting out the shank from the rod, being connected with the aforesaid pulley, as described.

Referring now to the drawings, I will describe the above-mentioned parts and combinations in their order.

The pulley X or equivalent operates the main shaft K, running through the frame A of the machine and turning the cams J I H for operating the above-mentioned devices.

The cam J has the projection or part $j$ on one side of it and the complementary part $j'$ on the other side. By the cam-roll $j^3$ the wire-feed lever $k$ is operated upon the pivot $k'$ to carry the link $k^2$, supporting the toothed block $k^3$ for feeding the wire S. By the cam-roll $j^4$ the lever $t$ for operating the chuck $d^3$ for holding the wire is operated, being pivoted at $t'$ and terminating in the part $t^2$, which presses against the collar $d$, bearing against the spring $d'$, which bears in turn against the upright $m$, which supports the eccentric sleeve $d^2$. The sleeve $d^2$ is loosely mounted in shaft D and eccentric therewith, and the chuck $d^3$ is compressed by being forced by the sleeve $d^2$, under force of spring $d'$, into the taper $d^4$ of D. The movement of the wire-operating lever $k$ $k^3$ is limited by the stop $m'$, and the normal positions of $k$ and $t$ are effected by the spring $m^2$. The shaft K operates also the cam I, having the cam-groove $i$ and cam-roll $i'$, the pin $i^2$ extending into the shaft E, which has the angle-piece or arm N for operating the collar M. It will be seen that by the revolution of the cam I the shaft E and its angle-piece N will be carried forward and back for moving the wedges and knives, as described.

The pulley L contains three slots and three knives—namely, the knife for cutting the groove producing the neck and head of the stud, the knife for channeling the finished top, and the knife for severing the completed stud from the wire rod. The parts connected with this pulley device L are the collar M, to which is riveted the wedge O and also the wedge P. The bearing L' is the bearing of these parts and of the pulley L. The neck-and-head-forming knife $a$, having the cutting edge $a'$, is fastened by the stud $a^2$ to the slide $e$, which is normally held by the spring $e'$ in the position shown in Fig. 2. The knife $b$ for cutting off the completed lacing-stud has the cutting edge $b'$ and is pivoted by the bolt $b^2$ to the wedge-piece $f$, which is normally held by the spring $f'$ in the position shown in Fig. 2. The channeling-knife $c^3$ $c^4$ is riveted by $c^5$ to the part $n'$.

It will be seen that upon revolution of cam I and the moving forward of shaft E the angle-piece N will force the wedge-pieces O and P forward through the slots in the pulley, thus depressing the wedge-pieces $e$ and $f$, and so bringing the cutter $a$ into operation and the cutter $b$ for cutting off the same. The channeling-cutter $c^4$, while rotated by the pulley L, is brought into operation by the wedge-arm $n^3$ of $n$ entering pulley L and gradually bearing upon the wedge $n'$. In considering this construction it will be understood that the wire S, moving through the sleeve $d^2$ in the shaft D, will be properly held by means of the chuck $d^3$ and the chuck-operating mechanism, heretofore described. By this pulley L a rotary motion is communicated through arm $n$ to the shaft F, operating the drilling and shank-forming cutters. The wedge-arm $n$ by its arm $n^5$ fits into the slot $n^4$ in the pulley L and by its arm $n^6$ fits into the slot $n^7$ of said pulley, its part $n^3$ bearing against the block $n'$, which supports the channel-cutter $c^3$ $c^4$. The part $n$ is bolted to the shaft F, which in turn is supported in the standards C.

The forward and back movements of the drilling and shank-cutting knives, supported upon the shaft F, are produced by the cam H, having the groove $h$ and the cam-roll $h'$, connecting by the pin $h^2$ with the arm $g$ by which the shafts F and G are connected at the recess $g'$. The purpose in having the shaft G is to secure steadiness of movement of the shaft F, and to steady the cam H the bolt $h^3$ may be used. The stationary shaft F has the drill T concentric with its axis and also with the axis of the wire S, running in the sleeve $d^2$. The drill T perforates the shank of the lacing-stud as it is formed by cutting away or paring off of a sufficient amount of the wire by means of the knife $c$, having the cutting edge $c'$ and held by the screw $c^2$. The rotary movement of the drill T and the shank-forming knife $c'$ is communicated from the pulley L, as above pointed out.

When the shaft F, operated by its cam H, has brought the drill T and shank-cutting knife $c$ up to the wire S, the cutting and drilling operations go on as the shaft F moves gradually forward. Simultaneously the arm $n^6$ of the wedge-arm $n$ is forcing down the slide $n'$ and the channeling-knife $c^3$ $c^4$ upon the slide $n'$ is cutting the channel 1 upon the edge 2 of the head 3 of lacing-stud R, Fig. 6. The forward movement of the angle-iron N communicated from cam I forces forward the wedge O, which operates upon the knife-carrying slide $e$ before the wedge P operates upon slide $f$, carrying the slot-cutting knife $a$ $a'$.

It will be seen that the peculiar shape of the wedge O $o$ is such as to bring it into contact with the slide $e$ before the wedge P will come into contact with the slide $f$. It is also evident that the part $o$ on reaching the part $o'$ will cause a period of rest to block $e$ and knife $a$ while wedge P is finishing its forward movement. O and P recede simultaneously. It is, therefore, not until the operation of cutting out the slot $r$, Figs. 4 and 6, is about a third completed that the cutting-off knife $b$, carried upon the slide $f$, begins to operate. We therefore have the simultaneous operations of boring, paring down a shank, and cutting a trench upon the side of the head of the stud, the cutting out of the slot following next in order and the operation of severing the stud from the wire beginning when the latter operation is about one-third completed and the finishing after these operations are completed. The relative operations of the three cams upon the shaft K are such as to communicate the proper motion at the proper time to the wire-feeding mechanism, the moving shaft E and its dependencies, the moving shaft F and its dependencies, and the knives connected with the pulley L.

The drill T and shank-forming knife $c$ move concentrically with each other and with the stationary shaft F. The shank thus formed is concentric with the axis of the wire rod. The slot-cutting knife $a'$ is required to cut a slot $r$ in the side 1 of the head 3 of the lacing-stud R, so as to leave a neck 4 in a different axis from that of the shank. The channel-cutting knife $c^3$, again, has a motion concentric with the center of the wire and with that of the drill T, while the cutting-off cutter $b$ requires to be moved radially in order to sever the finished lacing-stud.

I secure the relative positions in the order as required as follows: The permanent shaft D has the sleeve $d^2$ eccentric with its center, as best shown in Fig. 2; but this sleeve $d^2$ is concentric with the wire which travels in it and with the drill T and the horizontal shaft F carrying said drill. As the pulley carrying the three cutters aforesaid revolves upon the shaft D upon the bearing L', it is evident that the relations of the slot-cutting knife $a$ to the wire will gradually alter as the wedge O $o$ advances so as to cut out the required slot $r$, as shown in Figs. 4 and 6; also, it will be seen that the relation of the cutting-off knife $b$ will constantly change with reference to the wire S during the movement of the part $f$ by the sliding wedge P; also, it will be evident that the rotary advance of shaft F will force the drill T into the end of the wire S, held firmly by the chuck $d^3$; also, it will be evident that the shank-forming cutter $c$ will advance with the drill T.

I will now describe the operation of my machine.

The wire S, having been placed within the sleeve $d^2$ eccentric with the shaft D in the position shown in Fig. 2, comes to be firmly held by the clutch $d^3$ through the clutch-operating lever $t$ by revolution of the cam J and the moving of the sleeve $d^2$ forward. By the advance of shaft E and angle-piece N by cam I and the coincident advance of horizontal shaft F by cam H the following operations will take place: The drill T will be forced against the wire and bore out the shank, the edge $c'$ of the shank-cutter $c$ will coincidently pare down the wire to the required size of the shank, the slot-cutting knife $a$, approaching the rod or wire S eccentrically by means of the movement of the part $e$ caused by wedge O, will in its eccentric movement about the axis of the wire cut out the groove $r$, as shown in Figs. 4 and 6, the channel-cutter $c^3$ will simultaneously cut an enamel-holding groove upon the side of the head of the stud, and the knife $b'$, carried upon the part $f'$, will by the forward movement of the wedge P be forced against the wire to sever the finished lacing-stud from the rod.

Upon the completion of the drilling, shank-cutting, and channeling operations the revolution of the cam H will carry the shaft F backward, removing the drill T from the stud-shank, together with the shank-cutting knife $c$, and allowing the finished lacing-stud R to fall clear of the machine when severed from the wire S. The rotation of the cam J by means of $j'$ will move the chuck-operating lever $t\ t^2$ to draw the sleeve $d^2$, so as to release the chuck $d^3$. Thereupon the cam J, by its part $j^3$, will move the wire-carrying lever $k$, so as to cause its part $k^3$ to propel the wire rod forward sufficiently to supply the place of the part that has become a completed lacing-stud. By the revolution of the cams, as above described, the operation will be repeated, and will result in the formation of lacing-studs entirely complete, except the enamel, from the original wire bar.

In an application of even date herewith I have claimed a device substantially like the construction of shaft, cam I, shaft E, and angle-piece N, and also a cutting device substantially like the construction of wedge P, slide $f$, knife $b$, and spring $f'$, and I do not, therefore, herein claim said devices except as constituting parts of new combinations herein. Nor do I claim as my invention such framework, shafting, and power-supplying devices as are in themselves well known in mechanics. Nor do I mean to limit myself to the precise elements or precise combinations shown by me where the same may be replaced with equivalents. In an application filed by me of the same date I have shown a device for moving the knives in the pulley toward the blank or rod substantially like the same device shown herein, and I therefore only claim said device herein in combination with other parts.

Having described my invention, what I claim is—

1. In a machine for making lacing studs, the combination of a tool-carrying pulley L, with a slotting device composed of a knife-moving slide $e$, beveled as shown and having the flat surface $o'$, a knife $a$ having the edge $a'$, a pin $a^2$ connecting said knife to said slide, and a spring $e'$ to carry the slide $e$ back to normal position; substantially as and for the purposes described.

2. In a machine for making lacing studs, the combination of a tool-carrying pulley L, with a slotting device composed of a knife-moving slide $e$, beveled as shown and having the flat surface $o'$, a knife $a$ having the edge $a'$, a connecting pin $a^2$, and a spring $e'$ to carry the slide $e$ back to normal position; and with a slide-operating wedge O, having the flat part $o$, and thereby adapted to move the knife radially toward the wire only until the part $o$ reaches the part $o'$ of the slide $e$ and holds it there until the cutting-off knife has severed the stud, after the slot $r$ has been completed; substantially as and for the purposes described.

3. In a machine for making lacing studs, the combination of a tool-carrying pulley L, with a channeling device composed of a knife-moving slide $n'$ beveled as shown, a straight knife $c^3$ having the edge $c^4$, a connecting pin $c^5$, and a spring $n^2$ to restore the slide $n'$ to normal position so combined and operated as to present said knife-edge concentrically and obliquely to the side of the head of the lacing stud; substantially as and for the purposes described.

4. In a machine for making lacing studs, the combination of a tool-carrying pulley L, with a channeling device composed of a knife-moving slide $n'$ beveled as shown, a knife $c^3$ having the edge $c^4$, a connecting pin $c^5$, and a spring $n^2$ to restore the slide $n'$ to normal position, and with a slide-operating wedge-arm $n^6$, a wedge-moving arm $n$ integral with, or carrying said wedge-arm $n^6$, and means of rotating said wedge-moving arm $n$; substantially as and for the purposes described.

5. In a machine for making lacing studs, the combination of a tool-carrying pulley L with a slotting device composed of a knife-moving slide $e$, beveled as shown and having flat surface $o'$, knife $a$ having the edge $a'$, a connecting pin $a^2$, a spring $e'$ to restore said slide to normal position, and with a cutting-off knife composed of the knife carrying slide $f$, knife $b$ having the edge $b'$, spring $f'$, and connecting pin $b^2$; substantially as and for the purposes described.

6. In a machine for making lacing studs, the combination of a tool-carrying pulley L, with a slotting device composed of a slide $e$, knife $a$ having the edge $a'$, connecting spring $e'$, and with a channeling device composed of slide $n'$, spring $n^2$, straight knife $c^3$ having the edge $c^4$, and connecting pin $c^5$; said channeling device so combined with said devices as to present its knife edge concentrically and obliquely to the side of the top of the lacing stud all substantially as and for the purposes described.

7. In a machine for making lacing studs, the combination of a tool-carrying pulley L, with a slotting device composed of the slide $e$, knife $a$ having the edge $a'$, spring $e'$, and with a cutting-off device composed of the slide $f$, knife $b$ having the edge $b'$, connecting pin $b^2$, and with a channeling knife composed of slide $n'$, straight knife $c^3$ having the edge $c^4$, spring $n^2$, and connecting pin $c^5$; said channeling device so combined with said devices as to present the channeling knife edge concentrically and obliquely to the side of the head of the lacing stud all substantially as and for the purposes described.

8. In a lacing stud machine having a wire-feeding device, a tool-carrying pulley as described, and one or more cutting devices, substantially as described, carried thereby, and one or more knife-moving wedges and a sleeve carrying the same, the combination, as a device for advancing said wedges, of a wedge-moving angle-piece N, adapted to press against said wedges, a reciprocating shaft E to move said angle-piece, and a cam I to move said shaft, with the proper connections therefor; substantially as described and shown.

9. In a machine for making lacing studs from wire, the combination with wire feeding devices, of a sleeve and one or more knife-moving wedges as described carried thereon, one or more eccentrically moving knives adjustable by said wedge or wedges, a wedge-moving device consisting of the presser-piece N, shaft E, cam I, and connections, and a tool-carrying pulley carrying the knife or knives around the wire; the whole so combined and operated, as to bring the knife or knives eccentrically against the wire, to respectively cut out a slot, and sever the completed stud; substantially as described and shown.

10. In a machine for making lacing studs, in combination with wire-feeding devices, the tool-carrying pulley L, the slotting device composed of knife-carrying slide $e$, beveled as shown and having the part $o'$, knife $a$, and spring $e'$, the cutting-off knife composed of the knife-carrying slide $n'$, beveled as shown, spring $n^2$, knife $c^3$, the wedge O having the part $o$, the wedge P, and a device for advancing said wedges; substantially as and for the purposes described.

11. In a machine for making lacing studs, in combination with wire-feeding devices, the tool-carrying pulley L, slot-cutting device composed of slide $e$, properly beveled and having part $o'$, knife $a$, having edge $a'$, and pin $a^2$, the wedge device O having the part $o$, the cutting-off device $b$, having the edge $b'$, and pin $b^2$, the wedge device P, and the channeling device composed of slide $n'$, spring $n^2$, knife $c^3$, having edge $c^4$ and connecting pin $c^5$, and a wedge and wedge-moving devices therefor; substantially as described and shown.

12. In a machine for making lacing studs, the combination of cam H, having a groove $h$, a roll $h'$, a connecting pin $h^2$, with a supporting or stiffening horizontal bar G and with a revolving, traveling horizontal shaft F, adapted by means of the parts $g$, $g'$, and the said roll $h'$ and pin $h^2$ to gear into said cam H, and with a drill T, properly mounted at the end of said revolving, traveling horizontal shaft F, and with a shank-cutter $c$, attached to and moving with said horizontal shaft F; substantially as described.

13. In a machine for making lacing studs, in combination with a main shaft, cam mechanism, and wire-feeding devices as described, the shaft D and sleeve $d^2$ eccentric therewith, a tool-carrying pulley L, properly slotted, a cutter to be carried thereby concentric with the wire, two cutters to be carried thereby eccentric with the wire, as described, wedge and wedge-moving devices as described, for moving said cutters, the shaft F concentric with the sleeve $d^2$ and eccentric with the shaft D, and devices for oscillating said shaft F, a shank-cutter, and a drill carried upon the shaft F and a wedge-arm $n$, carried upon said shaft F and gearing with said pulley L; substantially as and for the purposes described.

14. In a machine for making lacing studs, having wire-feeding devices, a tool-carrying pulley, cutting devices carried thereby, and means for operating the same, the combination of a cam, a horizontal traveling and revolving shaft F, operated by said cam, a drill and shank-cutter carried upon said shaft, and a wedge-arm connected with said shaft and with the tool-carrying pulley aforesaid and adapted to bring one of the cutters carried by said pulley into operation in connection with the operation of the drill and shank-cutter upon said shaft F; substantially as and for the purposes described.

15. A machine for manufacturing completed lacing studs from rod or wire having a framework, driving pulley, main shaft and three cams, a stationary shaft and an eccentric sleeve therein, and mechanism substantially as described for feeding the wire and operating the wire-holding chuck mechanism, substantially as shown, for forming the neck of the stud, for cutting a channel upon the side of the head of the stud, and for severing the completed stud from the wire, a cam and wedge mechanism for moving said cutters, a pulley for carrying said wedge-mechanism and said cutting mechanism, a reciprocating shaft and a cam therefor, a drill and shank-cutter carried thereon, and mechanism connecting said oscillating shaft with said pulley; substantially as described and shown.

16. A machine for manufacturing lacing studs composed of wire-supporting and feeding devices, a pulley and slotting, channeling and cutting-off cutters operated thereby, wedge and wedge-moving mechanism for moving said cutters, shank-cutting and drilling devices, and a wedge-arm connecting the pulley with the shaft carrying said devices last named and constructed to operate as a wedge for the channeling knife; substantially as described.

17. A machine for manufacturing lacing studs composed of wire-supporting and feeding devices, a pulley and slotting and cutting-off cutters operated thereby, wedge and wedge-moving mechanism for moving said cutters, shank-cutting and drilling devices, and a wedge-arm connecting the pulley with the shaft carrying said devices last named; substantially as described.

In witness whereof I hereunto set my hand this 28th day of February, 1895.

HERBERT S. CROMBIE.

In presence of—
NATHANIEL U. WALKER,
L. C. SARGENT.